L. A. Warner,
Cider Mill.
Nº 58,514.          Patented Oct. 2, 1866.
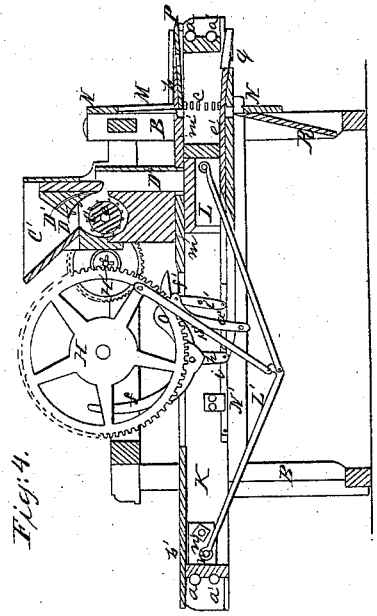
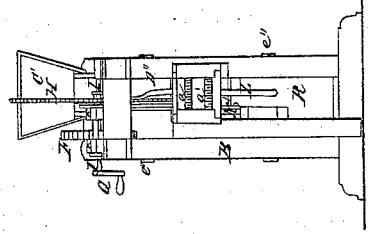
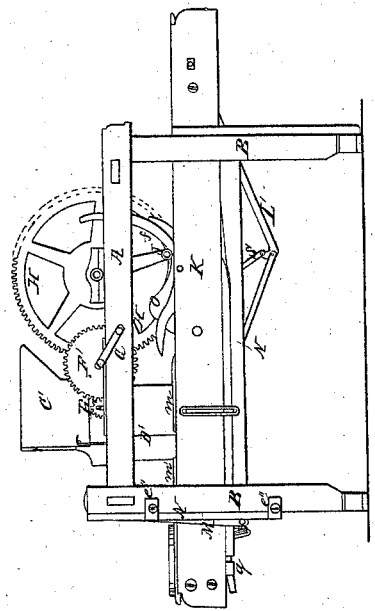
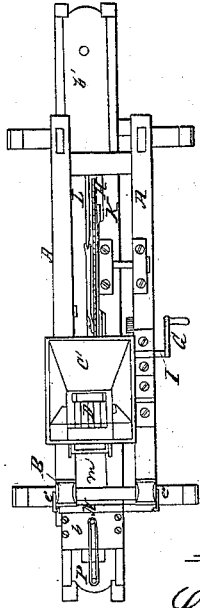
Witnesses:
J. A. Cram
R. M. Buckman
Inventor:
L. A. Warner

UNITED STATES PATENT OFFICE.

L. A. WARNER, OF FREEPORT, ILLINOIS.

CIDER-MILL AND FRUIT-PRESS.

Specification forming part of Letters Patent No. 58,514, dated October 2, 1866.

*To all whom it may concern:*

Be it known that I, L. A. WARNER, of Freeport, in the county of Stephenson and State of Illinois, have invented certain new and useful Improvements in Cider-Mill and Fruit-Press combined; and I do hereby declare that the following is a full and complete description of the construction and operation of the same, reference being had to the accompanying drawings, making a part of this specification, in which—

Figure 1 is a side view of the mill. Fig. 2 is a top view of the same. Fig. 3 is a rear-end view. Fig. 4 is a longitudinal sectional view.

Like letters refer to like parts in the several views.

A, Fig. 1, is a frame-work of wood, consisting of three pieces of timber, running parallel with each other. These timbers are framed into four posts, B, one at each corner of the frame, and which constitutes the legs of the machine, the whole being of a suitable height for the convenience of working the mill.

C, Fig. 4, is a grinder, and consists of a solid cylinder or roller of hard wood, the surface of which is studded with pins, for the purpose of cutting the fruit.

C' is a hopper, made to fit close around the cylinder, and so arranged as to allow the fruit to pass down between the cutting-cylinder and the front or upper jaw of the hopper. This jaw is made of narrow pieces of plank, forming slats D, Fig. 2. The upper end of these slats are hung to the inside of the hopper by a rod passing through them, giving to each thereby an independent vibratory motion. Back of each of these slats is placed a spring, D', Fig. 4, in order to force them against the cylinder, their lower end being shaped so as to conform to the circle of the roller, and is also studded with pins or teeth for the purpose of preventing the fruit from rolling in the hopper when in operation.

D'' is a box, extending down from the hopper, to convey the pomace to the press below.

The manner of driving the grinder is as follows: On e—the shaft of the roller—is placed the pinion F, Fig. 1. This pinion is worked by the larger gear F', which in turn may be operated by hand by means of the crank G, or by any other suitable power.

H is a large gear-wheel, driven by a spur or pinion, H', on the crank-shaft I. On one side of the larger wheel is a stud, J, Fig. 1. This stud is provided with a friction-roller or loose collar, and is for the purpose of operating certain levers hereinafter referred to.

K is the body of the press, the sides of which are made of strong plank, and fastened together by the screws or bolts $a\ a'$, Fig. 4, and the covers $b\ b'$. The press is secured to the inside of the post, and supported by the same in the position shown in the drawing. Fitted to the inside of the front end of the press is a piston, L, Fig. 4. This piston is operated by the compound or jointed lever L', in the manner hereinafter described.

C, Fig. 4, is a strong metallic grate or strainer, galvanized, to prevent it from corroding. It also forms the head of the press, against which the piston acts while pressing the pomace.

$e'$ is a slide that forms the inner bottom of the press, and slides in a rabbet, the inner lower edge of the sides of the press being rabbeted out for this purpose. This slide is also operated by levers, as will hereinafter be shown.

M, Fig. 4, is a core-driver, and is attached to a gate frame or sash, N, Figs. 1 and 2, and moves upward or downward in stays $e''$ by means of the lever N', which is connected by a pitman, $a''$, to the curved lever O. $p$ is a sliding cover, the purpose of which will be hereinafter shown. This cover is attached to the curved lever $f$, and by which it is worked by the connecting-rods $f'$. The cover and rods work in a rabbet cut along the inner upper edge of the press, in the same manner as that in which the slide $e'$ at the bottom works, as above described.

$q$ is a spout leading from the press to the front, for the conducting away of the juice. R, Fig. 3, is a guard-board, placed under the front of the press, and is hung on pivots or hinges at the bottom, so that the upper end may move to the front to catch the pomace as it falls from the press, and convey it back to the rear.

The manner of operating the press is as follows: The fruit being thrown into the hopper and ground, the pomace passes down between the roller and the front side of the hopper through the conductor D'' into the press.

The piston at this time being drawn back permits of a sufficient quantity to form a cheese or core to be introduced. The opening at the bottom of the press through which the core is driven out is closed by the slide $e'$ being moved forward. The press on being filled, the piston is driven forward by the jointed lever $L'$, one end of which is secured to the piston and the other to the rear end of the press, a pitman, S, connecting it with the gear-wheel H. On turning the wheel the lever is drawn upward. At the same time the piston moves toward the head of the press until the lever comes into a right line with the side—at this point is the extreme working of the piston—and is then drawn back by continuing the revolution of the wheel, the stud J pressing down upon the end of the curved lever O, and which is connected to the center of the long lever $N'$. This lever, as above stated, being connected at one end to the frame or sash N and the other to the press, causes the core-driver to pass down into the press and force the core or cheese out at the bottom; and, as the stud passes over the fulcrum and pressing upon the other arm of the lever, causes it to rise up again. To assist in the upward movement a rubber spring is attached to the gate and fastened to the press; also, a similar spring is connected to the lever $N'$ and the press for the same purpose. The same results may be obtained by the use of weights.

The slide $e'$ is worked by the curved lever $f$, and is connected to the lever by an arm, $h$, reaching down to and connecting with the rod $i$, to which the slide is attached. The stud, acting upon the front end of the curved lever, presses it downward, and this, in turn, causes the arm $h$ to move back toward the rear end of the press, and carrying with it the slide. The stud on passing the fulcrum presses again on the opposite arm of the lever, and thereby causing a reverse action of the slide, and so on continuously, as the stud may revolve by by the revolution of the wheel.

The sliding cover $p$ is operated by the same lever and at the same time by its being connected to the lever by the rods $f$ and evener $i'$, turning upon a center, one end of which is connected to the rod $i$ of the bottom slide, and the other works the rod of the sliding cover. Thus, as the lower slide is drawn back, the upper one is at the same time moved forward in the opposite direction. This movement of the sliding cover is made more equal by another evener similar to the first on the opposite side, and operating in the same way.

The guard-board above described is operated by the long straight lever $N'$, as follows: At the end of the lever and just back of the guard-board is a pin. This pin, as the lever is moved down, presses against the back of the board and forces the upper end forward beyond the opening at the bottom of the press, through which the core or cheese falls. On the reverse action of the lever the gate or sash presses against the front of the board, causing it thereby to move back again, and so on, the pin forcing it out in its downward movement and the sash forcing it back in its upward.

As above stated, when the piston is drawn back for the filling of the press the movement of the slide $e'$ is such that the aperture at the bottom is closed by the slide, preventing thereby the pomace from falling through. The core-driver also, by means of the lever above described, is up out of the press, and the cover $p$ closed over the opening through which the core-driver passes, so that the pomace cannot escape through that opening on being pressed. When the piston has traversed the length of the press the action of the lever upon the bottom slide is such as to open it. At the same time the cover is slid back and the core-driver forced down upon the cheese and driving it out at the bottom. When the core is thus driven out the core-driver is again raised up, and the slide moved over the opening ready for pressing again.

To regulate the degree of pressure the outer end of the jointed lever is backed by a spring to receive the pressure. The end of the lever is secured to the press by a pin passing through it and the side of the press forming a joint, the pins moving in slots for the purpose of allowing any vibratory movement. The lever can also be moved backward or forward by a pair of adjustable stays secured to the inside of the press, and through which the joint-pin passes. By this means a greater or less quantity of pomace may be introduced into the press.

The slides and connecting-rods, as before mentioned, move in the rabbets cut along the inner edges of the press. The covers $m m'$, which form the top of the press, are also rabbeted, so that they fit down into the press far enough to cover the rods, thereby protecting them from the pomace and holding them in their proper place.

The piston may be constructed as follows: It, being made of a sufficient length to work steadily, is made tight by placing packing between the face and body of the piston. The face-plate is fitted to a miter-joint all around and fastened by bolts passing through the piston-packing, is placed in the miter-joint or around the body of the piston, and when the pressure is applied it is forced outward against the sides of the press, thereby making it tight and loosening it on removing the pressure.

The slide $e'$ is made to pass into the bottom cross-piece far enough to allow the motion of the slide, which is mortised through for the passage of the core, being so made in order to prevent fouling with pomace, which would fill up the cavity, so as to stop the slide from passing far enough in to make it tight and strong, and thus prevent its working.

What I claim as my improvement, and desire to secure by Letters Patent, is—

1. The press K, piston, L, strainer C, slides $p$ and $e'$, core-driver M, rods $i$ and $f'$, curved levers $f$ and $o$, and jointed lever L', arranged in the manner substantially as shown and described, and for the purpose set forth.

2. The arrangement of the attachment of the jointed lever L' to the rear end of the press by the spring $n$, and adjustable stays $n'$, and connecting-rod S, for the purpose and in the manner set forth.

3. The wheel H, friction-roller J, as arranged, in combination with the levers $f$, $o$, and $s$, for the purpose and operating in the manner described.

L. A. WARNER.

Witnesses:
J. S. CRANE,
R. M. BUCKMAN.